(12) United States Patent
Ackermann

(10) Patent No.: US 6,779,644 B2
(45) Date of Patent: Aug. 24, 2004

(54) CLUTCH ARRANGEMENT

(75) Inventor: Jürgen Ackermann, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/287,247

(22) Filed: Nov. 4, 2002

(65) Prior Publication Data

US 2003/0089573 A1 May 15, 2003

(30) Foreign Application Priority Data

Nov. 9, 2001 (DE) .......................... 101 55 214
Oct. 12, 2002 (DE) .......................... 102 47 701

(51) Int. Cl.[7] .......................................... F16D 25/062
(52) U.S. Cl. .............................. 192/109 F; 192/85 A
(58) Field of Search ..................... 192/109 F, 85 A, 192/88 A, 109 R, 109 B, 3.28, 3.29, 3.3

(56) References Cited

U.S. PATENT DOCUMENTS

| | | | | |
|---|---|---|---|---|
| 3,690,429 A | * | 9/1972 | Honda ................... | 192/85 AA |
| 4,083,442 A | * | 4/1978 | Ushijima ................ | 192/54.3 |
| 4,664,242 A | * | 5/1987 | Downs .................... | 192/106 F |
| 5,511,644 A | * | 4/1996 | Murata .................. | 192/85 AA |
| 5,950,787 A | * | 9/1999 | Murasugi et al. ........ | 192/85 AA |

* cited by examiner

*Primary Examiner*—Saúl J. Rodriguez
(74) *Attorney, Agent, or Firm*—Cohen, Pontani, Lieberman & Pavane

(57) ABSTRACT

At least one first friction member is connected with a fluid-filled housing to rotate jointly therewith, and at least one second friction member connected with a driven member so as to rotate jointly therewith. The friction members can be pressed against one another when at least one pressing member is acted upon by fluid. A pressure storage arrangement associated with the at least one pressing member can be brought into a pressure storage state when the at least one pressing member is acted upon by pressure fluid and acts upon the pressing member with the stored pressure.

18 Claims, 2 Drawing Sheets

CLUTCH ARRANGEMENT

BACKGROUND OF THE INVENTION

1. Field of the Invention

The present invention is directed to a clutch arrangement, particularly for a motor vehicle, comprising a housing arrangement which is filled with fluid or which can be filled with fluid, at least a first friction member which is connected with the housing arrangement so as to rotate jointly therewith, at least a second friction member which is connected with a driven member or which can be connected with a driven member so as to rotate jointly therewith, wherein the friction members can be pressed against one another when at least one pressing member is acted upon by fluid.

2. Description of the Related Art

Clutch arrangements of the type mentioned above are used, for example, in the area of hydrodynamic torque converters as lockup clutches, but also as so-called wet clutches for transmission of torque in a drivetrain. In order to bring these clutches involving the use of pressure fluid into an engaged state, a piston-like pressing element is acted upon by pressure fluid and is accordingly displaced for pressing various friction surfaces against one another. The fluid pressure required for this is generally furnished by a pump provided in the area of a gear unit.

There are basically two different configurations in systems of this kind. In a so-called two-line system, the pressing piston element which divides the interior of the housing essentially into two chamber areas has an opening called a piston nozzle. The fluid is supplied under pressure to one of the chamber areas. The fluid can flow into the other chamber area via the piston nozzle by generating the pressure difference required for producing the engaged state and can be extracted from this other chamber area. An essential disadvantage of this system is the fluid leakage which exists between the two chamber areas in every state and which is even present when cooling of the system by fluid exchange is not required. In the three-line system, as it is called, a fluid exchange which is provided for cooling, for example, is carried out in the chamber area in which the frictionally contacting surfaces act to produce the torque transmission state, independent from the supply of fluid to the other chamber area. Pressure fluid is then introduced into the other chamber area, for example, for generating the pressure to be applied. Also, a permanent power loss of the pump pumping the pressure fluid is required for maintaining the torque transmission state, i.e., for maintaining the pressure difference between the two chamber areas. Other known systems work on the principle that the engagement force is supplied by a spring element, that is, e.g., a diaphragm spring or disk spring or a helical pressure spring, and that the force required for disengagement is to be provided by applied pressure. Besides the fact that the engaging forces required for producing the torque transmission state can often not be supplied by conventionally constructed diaphragm springs or helical pressure springs, a permanent operation of the pump is required in this arrangement in the disengaged state, also.

SUMMARY OF THE INVENTION

It is the object of the present invention to provide a clutch arrangement, particularly for a motor vehicle, in which it can be ensured in a simple and reliable manner that the application of pressure required for achieving and maintaining a determined clutch state can be provided.

According to the present invention, the clutch arrangement has a pressure storage arrangement which is associated with the at least one pressing member and which is in a pressure storage state or can be brought into a pressure storage state when the at least one pressing member is acted upon by pressure fluid and acts upon the pressing member with the stored pressure.

Thus, according to the principles of the present invention, when the application of pressure is initiated a pressure storage is also charged at the same time and then also acts upon the at least one pressing member and accordingly ensures that the pressing member is acted upon with sufficient force for generating the frictional connection regardless of whether or not fluid pressure continues to be supplied by a pump.

It may be provided, for example, that the pressure storage arrangement has at least one pressure storage piston element which can be displaced against the action of a force accumulator when acted upon by pressure. The force accumulator is preferably constructed in the manner of a disk spring.

In an embodiment form that is particularly advantageous because of the efficient use of the available space, the at least one pressing member comprises an annular pressing piston element which surrounds the pressure storage piston element, and a seal arrangement is provided between the pressing piston element and the pressure storage piston element, which seal arrangement permits relative displacement. In this connection, it can also be provided that the at least one pressure storage piston element is constructed annularly and is preferably supported at a radial inner side so as to be tight against fluid and displaceable with respect to the housing hub.

According to another advantageous feature of the present invention, it is preferably provided that a working surface of the pressure storage piston element is smaller than a working surface of the pressing piston element. Since the pressing piston element and the pressure storage element communicate with one another for mutual transmission of pressure, an increase in the force exerted by the pressure storage piston element is achieved by means of this dimensioning. This permits the use of a comparatively weaker force accumulator acting on the pressure storage piston element while nevertheless achieving a sufficient pressing force.

In the construction of the clutch arrangement according to the invention, in order to ensure above all that the pressing pressure provided by the charging of the pressure storage is also maintained over a longer time period, it is proposed that the at least one pressing piston element, the at least one pressure storage piston element and the housing arrangement define a first fluid chamber area which essentially does not communicate in a fluid exchanging connection with a second fluid chamber area associated with the friction members.

In another advantageous feature of the present invention, a valve arrangement is associated with the first fluid chamber area, which valve arrangement can block the first fluid chamber area after pressure fluid is supplied to the latter. In this way, it can be ensured that a fluid delivery pump need not continue to be operated once the engaged state has been produced, at least for maintaining this state. In a clutch arrangement according to the invention, the engaged state can be maintained simply by closing the first fluid chamber area and by providing the pressure storage which further ensures a sufficient pressing pressure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
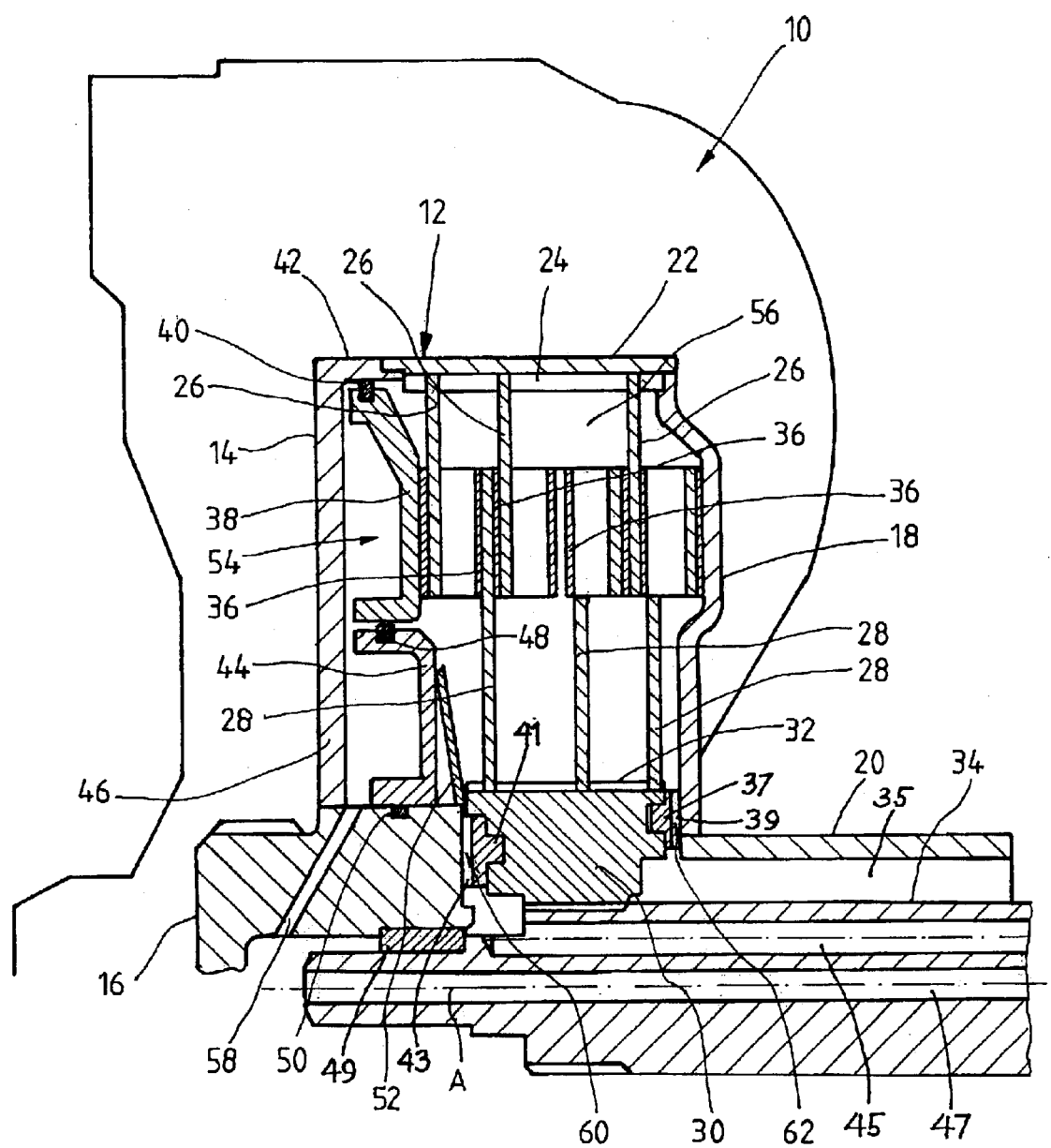
FIG. 1 shows a simplified longitudinal sectional view through a clutch arrangement according to the invention.

In FIG. 1, the clutch arrangement 10 can be constructed as a so-called lockup clutch and can accordingly be part of a hydrodynamic torque converter, but can also be constructed as a conventional wet clutch. The clutch arrangement 10 comprises a housing arrangement 12 having a housing cover 14 which is fixedly connected in its radial inner area with a housing hub 16. The housing cover 14 and the housing hub 16 can be coupled for common rotation with a driving member, e.g., a crankshaft of an internal combustion engine.

A housing part 18 which is located axially across from the housing cover 14 is fixedly connected in its radial inner area with a pump hub 20. This pump hub 20 can extend into a gear unit housing and drive a fluid delivery pump.

On the radial outer side, an approximately cylindrical housing part 22 connects the housing cover 14 to the housing part 18. The housing part 22 has teeth 24 at its inner circumferential side. Plates 26 mesh with the teeth 24 and are connected in this way to the housing arrangement 12 for common rotation but are displaceable axially with respect to the housing arrangement 12 by means of the configuration of the teeth 24, which extend in direction of the axis of rotation A. Further, plates 28 are provided which mesh in their radial inner area with teeth 32 formed at a driven hub 30 so as to extend in direction of the axis of rotation A. As is conventional, the driven hub 30 can be coupled with a driven member 34, for example, a transmission input shaft, so as to be fixed with respect to rotation relative to it. The housing hub 16 is mounted at the transmission input shaft 34 via a sliding bearing sleeve 17. The plates 26 and 28 respectively form first and second friction members which, as was already mentioned, are connected with, or can be connected with, the housing arrangement 12 and a driven member 34 so as to rotate in common, and can have frictional contact with one another, for example, in the area of the friction facings 36 which can be provided at least at some of these plates 26, 28.

An annular pressing piston 38 is provided in the housing arrangement 12. This pressing piston 38 is supported at its outer circumferential area at a cylindrical portion 42 of the housing cover 14 via a sealing element 40 so as to be tight against fluid. A pressure storage piston 44 of a pressure storage arrangement 46 to be described in more detail is also provided. This pressure storage piston 44 is also annular and is positioned in such a way that it lies radially between the inner circumferential area of the pressing piston 38 and the outer circumferential area of the housing hub 16. A sealing element 48 is provided between the pressing piston 38 and the pressure storage piston 44. A sealing element 50 is likewise provided between the radial inner area of the pressure storage piston 44 and the housing hub 16. In this way, the two pistons 38, 44 are displaceable relative to one another and can also be displaced in axial direction with respect to the housing arrangement 12 and the housing hub 16.

Further, a force accumulator 52 which is constructed, e.g., as a diaphragm spring or disk spring, is associated with the pressure storage piston 44 of the pressure storage arrangement 46 and acts upon the pressure storage piston in direction of the housing cover 14. It will be seen in FIG. 1 that the interior of the housing arrangement 12 is divided into two chamber areas in the construction described above. A first chamber area 54 is formed substantially between the two pistons 38, 44 and the housing cover 14. A second chamber area 56 is substantially enclosed by the two pistons 38, 40 and the housing parts 22, 18 and contains the plates 26, 28.

Both chamber areas 54, 56 can be made to connect to a fluid pressure source, that is, for example, the fluid pump which is provided in the housing and is described above. The fluid can be conducted from the fluid pump, for example, through an intermediate space 35 formed between the transmission input shaft 34 serving as driven member and the pump hub 20, to a volume area 62 in which the driven hub 30 is supported axially with respect to the housing arrangement 12 via a supporting element 37 constructed, e.g., as a sliding bearing ring. In this supporting element 37, through-openings 39 are provided which enable the fluid to enter the interior of the housing arrangement 12. At the other axial end, the driven hub 30 is supported axially at the housing hub 16 in a volume area 60 by means of another supporting element 41 which is constructed, for example, as a sliding bearing element. Also, this supporting element 41 has a plurality of through-openings 43. The fluid can flow radially inward via these through-openings 43 and can flow into one or more channels 45 which are provided in the shaft 34 eccentric to the longitudinal center axis A of the shaft 34. These channels 45 lead back to a fluid reservoir. The fluid is supplied to the chamber area 54 through an opening or bore hole 47 which is provided centrally in the shaft 34 and through which fluid can be conducted into the housing hub 16 and then, through openings 58 provided therein, into the chamber area 54. In order to prevent an unwanted fluid exchange between first chamber area 54 and second chamber area 56, a sliding bearing sleeve element 49 serving for axial and/or radial bearing support of the housing hub 16 can also be provided at the shaft 34 at the same time and can also produce an essentially fluid-tight closure at the same time.

Figure 2:
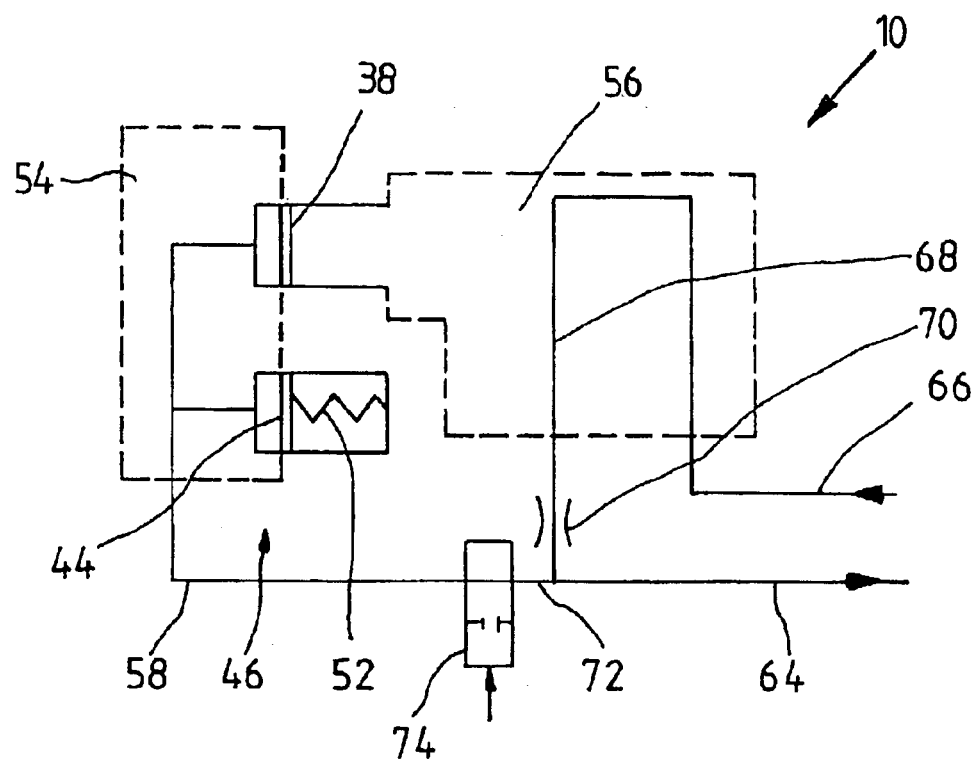
FIG. 2 shows a schematic view of a clutch arrangement according to the invention which is constructed in the manner of a two-line system.

The functioning of the clutch arrangement 10 described above is described in the following with reference to FIGS. 2 and 3. First, FIG. 2 shows schematically the construction of a two-line system, as it is called. This means that there is a fluid feed line 64 and a fluid discharge line 66, the fluid being delivered by the fluid delivery pump via line 64 and drained into a fluid reservoir via line 66. FIG. 2 also shows the two schematically indicated chamber areas 54, 56. Chamber area 56 contains friction members which are not shown in FIG. 2, that is, e.g., the plates 26, 28. Fluid is introduced into chamber area 54 via the openings 58 mentioned above. In the two-line type system shown in the drawing, the fluid feed line 64 branches into branch 68 which leads, e.g., via a choke 70, to chamber area 56 and a branch 72 which leads into chamber area 54 via openings 58. A switchable valve 74 is provided in this branch 72 and can be switched, for example, in such a way that the state shown in FIG. 2 which allows a fluid to be supplied to chamber area 54 can be switched to a state in which the branch 72 is interrupted and chamber area 54 is accordingly blocked with respect to the delivery and removal of fluid.

The operation of this arrangement, shown in FIG. 2, will be described in the following. When the clutch arrangement 10 is to be brought into an engaged state, the branch 72 is released by appropriate control of the valve 74, so that the pressure generated through the choke 70 can continue into the chamber area 54. In so doing, the fluid pressure in chamber area 54 is increased relative to the fluid pressure in chamber area 56. Consequently, the pressing piston 38 is displaced so that it presses the individual plates in the area of the frictionally active surfaces of these plates against one another and also against the housing arrangement 12. Along with this application of pressure to the pressing piston 38, the pressure storage piston 44 is also acted upon and is displaced against the action of the force accumulator 52 which can, of course, also be constructed as a helical pressure spring or the like. The force accumulator 52 is constructed in such a way or is provided with characteristics such that it is not yet stopped or blocked at maximum pressure in the chamber area 54. When the clutch arrangement 10 is moved into its completely engaged state by generating a corresponding pressing force, the valve 74 is switched again and the branch 72 is blocked against further supply of fluid or drainage of fluid. There is now a certain fluid pressure in the chamber area 54 which is sufficient for transmitting the maximum anticipated torque. Fluid leakage occurring in the area of the various sealing elements, for example, also does not lead to a decrease in pressing force which would jeopardize the operating characteristic, since the pressure storage arrangement 46 ensures that such slight leakage in the system can be compensated and a sufficient fluid pressure can be maintained in the chamber area 54. In this state it is no longer required to drive the fluid delivery pump to maintain the engagement pressure. Rather, this fluid delivery pump can pump fluid into the chamber area 56 via the branch 68 and therefore can contribute to cooling regardless of whether or not there is a sufficiently high pressure in chamber area 54.

Figure 3:
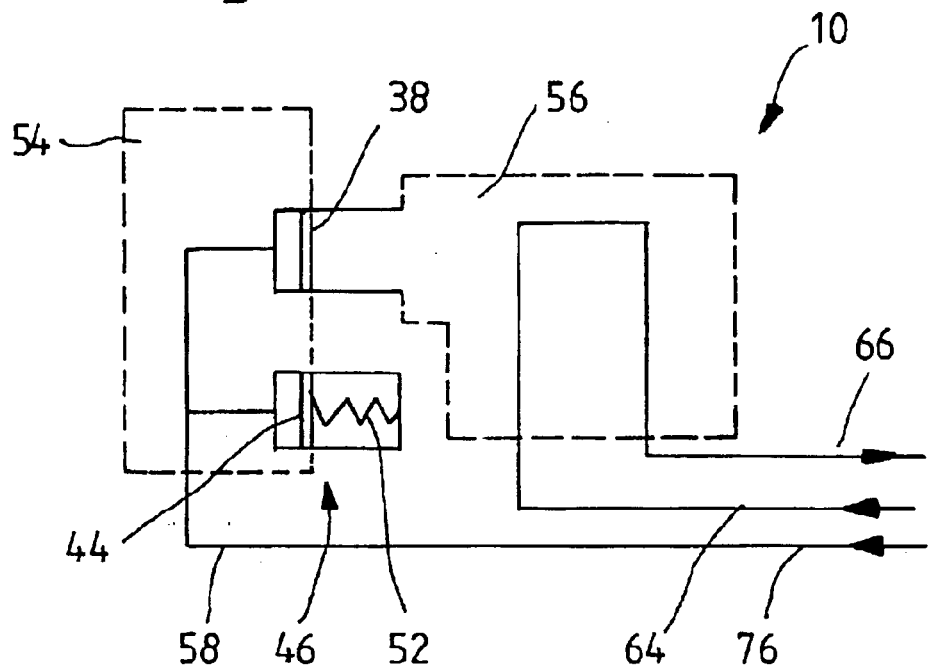
FIG. 3 is a view corresponding to FIG. 2 showing a clutch arrangement which is constructed in the manner of a three-line system.

FIG. 3 shows the clutch arrangement 10 which is constructed as a three-line system. Two fluid flow systems which are constructed substantially separately are shown. A first fluid flow system has a fluid feed line 64 and a fluid feed line 66 which accordingly ensures a fluid exchange in chamber area 56 containing the frictionally active surfaces. Fluid is conveyed by the fluid delivery pump to the openings 58 and into chamber area 54 via the additional fluid feed line 76. In this case, for example, fluid is conveyed to fluid feed line 64 or to fluid feed line 76, as desired, via a switching valve. When a fluid pressure sufficient for achieving the torque transmission state is built up in the chamber area 54 and the pressure storage arrangement 46 is moved into its pressure storage state, the fluid supply can be shut off via the fluid feed line 76 so that the chamber area 54 is essentially blocked against the supply and drainage of work fluid.

In the two systems shown in FIGS. 2 and 3, it is ensured that fluid can flow through the chamber area 56 containing the frictionally active surfaces essentially regardless of whether or not an engagement state is to be provided. These embodiment forms according to the invention are a substantial advantage when using an electrically driven pump for the oil supply which is activated when needed and is accordingly activated only when the buildup of fluid pressure is actually needed and not, as is the case, for example, in known hydrodynamic torque converters, activated permanently for generating a fluid pressure which involves corresponding leakage losses. A further advantage of the system according to the invention consists in that the pressing piston 38 can always be moved into the correct engagement state when the pressing piston 38 is acted upon by fluid regardless of the state of wear of any friction facings or the like without having to replace any self-adjusting components as, for example, in wear compensating systems known in dry clutches. Further, due to the ratio of the active surfaces of the pressing piston 38 for the application or generation of pressure and the active surfaces of the pressure storage piston 44, an increase in pressure or force can result so that comparatively small or weak force accumulators can be used. This increased force can be achieved, for example, in that the working surface of the pressure storage piston 44 is smaller than the working surface of the pressing piston 38. This has the result in the present arrangement that the pressing piston 38 forms a ring with a larger average diameter while retaining approximately the same radial extension (actually, the pressing piston 38 even has a somewhat larger radial dimensioning). In this way, the force accumulator 52 can be comparatively weaker while generating the required pressing force.

It is noted once again that the principle according to the invention can, of course, also be integrated in a hydrodynamic torque converter in the form of a lockup clutch. Further, it is evident that the quantity or specific construction of the plates or frictionally acting surface regions of the plates can be selected depending on specific requirements. In principle, it is also conceivable that the pressing piston 38 is brought into direct contact with a friction member which is rotatable relative to it. In this case, however, it must be ensured that the pressing piston 38 is held so as to be fixed with respect to rotation, for example, relative to the housing arrangement 12.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A clutch arrangement for a motor vehicle, said arrangement comprising:

a housing which can be filled with fluid;

at least one first friction member which is connected to the housing to rotate jointly therewith;

at least one second friction member which can be connected to a driven member to rotate jointly with said driven member;

a pressing member which presses said first and second friction members into driving engagement when said pressing member is acted on by a fluid in a first chamber, said first and second friction members being located in a second chamber; and a pressure storage arrangement comprising a pressure storage piston and a force accumulator which acts on said piston to store pressure in said fluid in said first chamber, said fluid acting on said pressing member only with stored pressure in the first chamber to press said first and second friction members into driving engagement, said pressure storage piston being displaceable against the action of said force accumulator when acted on by said stored pressure.

2. A clutch arrangement as in claim 1 wherein said force accumulator is a disk spring.

3. A clutch arrangement as in claim 1 wherein said pressing member comprises an annular pressing piston which surrounds said pressure storage piston, said clutch arrangement further comprising a seal between said annular pressing piston and said pressure storage piston, said seal permitting relative axial displacement between said pistons.

4. A clutch arrangement as in claim 3 wherein said housing comprises a central hub, said pressure storage piston being an annular piston having a radially inner side supported on said hub so as to be tight against fluid and to permit relative axial movement.

5. A clutch arrangement as in claim 3 wherein said pressure storage piston and said pressing piston each have an axially facing working surface, said working surface of said pressure storage piston being smaller than said working surface of said pressing piston.

6. A clutch arrangement as in claim 1 wherein said first and second fluid chambers are not in fluid exchanging communication.

7. A clutch arrangement as in claim 6 further comprising a valve arranged to block said first fluid chamber after pressure fluid is supplied to the first fluid chamber.

8. A clutch arrangement for a motor vehicle, said arrangement comprising:

a housing which can be filled with fluid;

at least one first friction member which is connected to the housing to rotate jointly therewith;

at least one second friction member which can be connected to a driven member to rotate jointly with said driven member;

an annular pressing piston which presses said first and second friction members into driving engagement when said pressing member is acted on by a fluid;

a pressure storage arrangement comprising a pressure storage piston surrounded by said annular pressing piston and a force accumulator which acts on said pressure storage piston to store pressure in said fluid acting on said pressing member, said pressure storage piston being displaceable against the action of said force accumulator when acted on by stored pressure; and a seal between said annular pressing piston and said pressure storage piston, said seal permitting relative axial displacement between said pistons, wherein said pressure storage piston and said annular pressing piston each have an axially facing working surface, said working surface of said pressure storage piston being smaller than said working surface of said annular pressing piston.

9. A clutch arrangement as in claim 8 wherein said force accumulator is a disk spring.

10. A clutch arrangement as in claim 8 wherein said housing comprises a central hub, said pressure storage piston being an annular piston having a radially inner side supported on said hub so as to be tight against fluid and to permit relative axial movement.

11. A clutch arrangement as in claim 8 comprising a first fluid chamber defined by said pressing piston, said pressure storage piston, and said housing, and a second fluid chamber containing said friction members, wherein said first and second fluid chambers are not in fluid exchanging communication.

12. A clutch arrangement as in claim 11 further comprising a valve arranged to block said first fluid chamber after pressure fluid is supplied to the first fluid chamber.

13. A clutch arrangement for a motor vehicle, said arrangement comprising:

a housing which can be filled with fluid;

at least one first friction member which is connected to the housing to rotate jointly therewith;

at least one second friction member which can be connected to a driven member to rotate jointly with said driven member;

a pressing member which presses said first and second friction members into driving engagement when said pressing member is acted on by a fluid in a first fluid chamber, said first and second friction members being located in a second fluid chamber;

a pressure storage arrangement comprising a pressure storage piston and a force accumulator which acts on said piston to store pressure in said fluid in said first fluid chamber when said fluid acts on said pressing member to press said first and second friction members into driving engagement, said pressure storage piston being displaceable against the action of said force accumulator when acted on by stored pressure in said fluid in said first chamber; and a valve arranged to block said first fluid chamber after pressure fluid is supplied to the first fluid chamber.

14. A clutch arrangement as in claim 13 wherein said force accumulator is a disk spring.

15. A clutch arrangement as in claim 13 wherein said pressing member comprises an annular pressing piston which surrounds said pressure storage piston, said clutch arrangement further comprising a seal between said annular pressing piston and said pressure storage piston, said seal permitting relative axial displacement between said pistons.

16. A clutch arrangement as in claim 15 wherein said housing comprises a central hub, said pressure storage piston being an annular piston having a radially inner side supported on said hub so as to be tight against fluid and to permit relative axial movement.

17. A clutch arrangement as in claim 15 wherein said pressure storage piston and said pressing piston each have an axially facing working surface, said working surface of said pressure storage piston being smaller than said working surface of said pressing piston.

18. A clutch arrangement as in claim 13 wherein said first and second fluid chambers are not in fluid exchanging communication.

* * * * *